(12) United States Patent
Hamamoto et al.

(10) Patent No.: US 6,559,755 B1
(45) Date of Patent: May 6, 2003

(54) STORAGE DEVICE AND METHOD, INFORMATION PROCESSING APPARATUS AND METHOD, AND PROVISION MEDIUM THEREFOR

(75) Inventors: Kenji Hamamoto, Tokyo (JP); Yasuhisa Nakajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/396,261

(22) Filed: Sep. 15, 1999

(30) Foreign Application Priority Data

Sep. 17, 1998 (JP) .............................. 10-262669

(51) Int. Cl.[7] ............................... H04Q 5/22
(52) U.S. Cl. ............. 340/10.6; 340/10.51; 340/825.71; 340/825.72
(58) Field of Search ................ 340/10.6, 10.51, 340/825.71, 825.72

(56) References Cited

U.S. PATENT DOCUMENTS

| | | | | |
|---|---|---|---|---|
| 5,113,184 A | * | 5/1992 | Katayama | 340/825.71 |
| 5,374,930 A | * | 12/1994 | Schuermann | 342/42 |
| 5,446,447 A | * | 8/1995 | Carney et al. | 340/825.71 |
| 5,640,164 A | * | 6/1997 | Gunnarsson | 340/825.72 |
| 6,417,978 B1 | * | 7/2002 | Enomoto | 360/72.2 |

* cited by examiner

*Primary Examiner*—Donnie L. Crosland
(74) *Attorney, Agent, or Firm*—Frommer Lawrence & Haug LLP; William S. Frommer

(57) ABSTRACT

A storage device and method stores tuning-frequency data, and extracts a tuning frequency from a received signal. Based on the stored tuning-frequency data, the tuning frequency extracted by the first extracting unit is adjusted. The storage device is accessed by an information processing apparatus, and data from the storage device are processed by an information processing method.

15 Claims, 15 Drawing Sheets

US 6,559,755 B1

STORAGE DEVICE AND METHOD, INFORMATION PROCESSING APPARATUS AND METHOD, AND PROVISION MEDIUM THEREFOR

BACKGROUND OF THE INVENTION

1. Field of the Invention

The present invention relates to storage devices and methods, information processing apparatuses and methods, and provision media therefor, and in particular, to a storage device and method for providing a memory card capable of reading and writing data in which changes in a tuning frequency are suppressed, an information processing apparatus and method using the storage device and method, and a provision medium therefor.

2. Description of the Related Art

In recent years, memory cards, in which the storage capacity is greatly increased by providing semiconductor chips such as integrated chips for storing and processing information (data), have been widely used as data cards.

Also non-contact memory cards have recently been developed in which a built-in data-transmitting-receiving antenna circuit (coil) for transmitting or receiving an input or output radio signal is used to perform non-contact data reading and writing with an external processing apparatus by a radio system.

FIG. 14 shows the structure of a non-contact memory card 91. An antenna 101 included in the memory card 91 receives radio waves from a non-contact memory-card reader-writer 92 (described below), and supplies a signal corresponding to the received radio waves to a tuning circuit 102 and a power-supply circuit 111. The tuning circuit 102 extracts, from the signal supplied from the antenna 101, a carrier frequency used for communication between the memory card 91 and the reader-writer 92.

An amplifying circuit 103 amplifies an input signal to a predetermined level, and outputs the amplified signal. A demodulating circuit 104 demodulates the modulated signal having the carrier frequency into predetermined data. A communication control circuit 105 performs switching between data transmission and reception. A microcomputer 106 controls other blocks of the memory card 91 in accordance with a control program stored in a read only memory (ROM) 107. Among data supplied via the communication control circuit 105, data to be stored are supplied as required from the microcomputer 106 to an electrically erasable and programmable read only memory (EEPROM) 108.

The EEPROM 108 stores the data supplied from the microcomputer 106. A modulating circuit 109 modulates the data supplied from the communication control circuit 105 into a signal having the carrier frequency, and outputs it. An amplifying circuit 110 amplifies the modulated signal having the carrier frequency, supplied from the modulating circuit 109, to a level necessary for communication. The antenna 101 uses radio waves to transmit the carrier frequency signal amplified by the amplifying circuit 110.

FIG. 15 shows the structure of a non-contact memory-card reader-writer 92. An antenna 121 transmits a predetermined signal to the memory card 91 and performs transmission and reception of predetermined carrier waves in order to communicate with the memory card 91. The antenna 121 also generates an electromagnetic field for supplying power to the memory card 91.

A tuning circuit 122 extracts, from a signal supplied from the antenna 121, the carrier frequency used for communication between the memory card 91 and the reader-writer 92. An amplifying circuit 123 amplifies the input signal to a predetermined level, and outputs it. A demodulating circuit 124 demodulates the modulated signal having the carrier frequency into predetermined data. A communication control circuit 125 performs switching between data transmission and reception, and communication control. A microcomputer 126 controls other blocks of the reader-writer 92 in accordance with a control program stored in the ROM 128. Among the data supplied via the communication control circuit 125, data to be stored are supplied as required from the microcomputer 126 to a random access memory (RAM) 129.

The RAM 129 stores the data supplied from the microcomputer 126. A modulating circuit 130 modulates data supplied from the communication control circuit 125 into a signal having a carrier frequency, and outputs it. An amplifying circuit 131 amplifies the modulated signal having the carrier frequency, supplied from the modulating circuit 130, to a level necessary for communication. The antenna 121 uses radio waves to transmit the amplified signal having the carrier frequency.

The above-described conventional memory cards have a problem in that performance deteriorates since a tuning frequency varies due to variations in the quality of components.

SUMMARY OF THE INVENTION

Accordingly, it is an object of the present invention to provide a storage device and method in which the tuning frequency of a memory card is adjusted to prevent performance from deteriorating, an information processing apparatus and method using the storage device and method, and a provision medium therefor.

To this end, according to an aspect of the present invention, the foregoing object is achieved through provision of a storage device for storing and processing information and for performing information transmission and reception with an external unit. The storage device includes a storage unit for storing tuning-frequency data, an extracting unit for extracting a tuning frequency from a received signal, and an adjusting unit for adjusting, based on the tuning-frequency data stored in the storage unit, the tuning frequency extracted by the extracting unit.

According to another aspect of the present invention, the foregoing object is achieved through provision of a storage method for storing and processing information and for performing information transmission and reception with an external unit. The storage method includes the steps of storing tuning-frequency data, extracting a tuning frequency from a received signal, and adjusting, based on the tuning-frequency data stored in the storing step, the tuning frequency extracted in the extracting step.

According to a further aspect of the present invention, the foregoing object is achieved through provision of a provision medium for providing a program to a storage device for storing and processing information and for performing information transmission and reception with an external unit. The program causes the storage device to execute a process including the steps of storing tuning-frequency data, extracting a tuning frequency from the received signal, and adjusting, based on the tuning-frequency data stored in the storing step, the tuning frequency extracted in the extracting step.

According to a still further aspect of the present invention, the foregoing object is achieved through provision of an information processing apparatus for accessing a non-contact storage method. The information processing method includes the steps of extracting a tuning frequency from a received signal, adjusting the tuning frequency extracted in the extracting step, and storing data read from the non-contact storage device.

According to yet another aspect of the present invention, the foregoing object is achieved through provision of a provision medium for providing a program to an information processing apparatus for accessing a non-contact storage device. The program causes the information processing apparatus to execute a process including the steps of extracting a tuning frequency from a received signal, adjusting the tuning frequency extracted in the extracting step, and storing data read from the non-contact storage device.

According to the present invention, a tuning frequency is adjusted based on a stored tuning frequency, whereby performance can be prevented from deteriorating.

BRIEF DESCRIPTION OF THE DRAWINGS

FIG. 10 is a flowchart illustrating a process in which the power supply of a display driver in the reader-writer 2 (shown in FIG. 9) is switched on;

DESCRIPTION OF THE PREFERRED EMBODIMENTS

Figure 1:
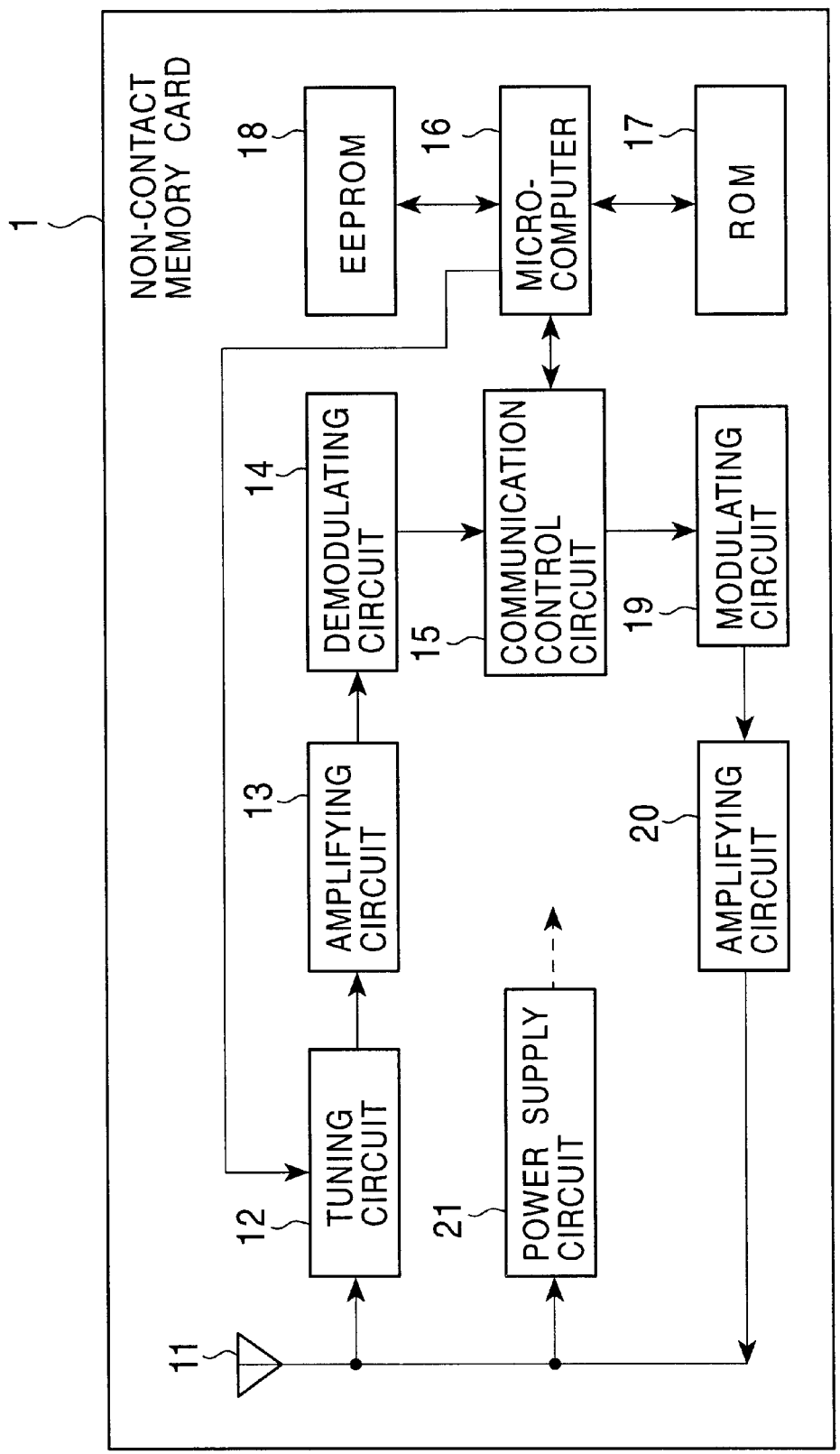
FIG. 1 is a block diagram showing a memory card 1 according to an embodiment of the present invention.

FIG. 1 shows a non-contact memory card 1 according to an embodiment of the present invention. An antenna 11 included in the memory card 1 receives radio waves from a reader-writer 2 (described below), and supplies a signal corresponding to the received radio waves to a tuning circuit 12 and a power supply circuit 21. The tuning circuit 12 extracts, from the signal supplied from the antenna 11, a carrier frequency used for communication between the memory card 1 and the reader-writer 2.

An amplifying circuit 13 amplifies an input signal to a predetermined level, and outputs it. A demodulating circuit 14 demodulates the modulated signal having the carrier frequency into predetermined data. A communication control circuit 15 performs switching between data transmission and reception. A microcomputer 16 controls other blocks of the memory card 1 in accordance with a control program stored in a ROM 17. Among data supplied via the communication control circuit 15, data to be stored are supplied as required from the microcomputer 16 to an EEPROM 18.

The EEPROM 18 stores the data supplied from the microcomputer 16. In the EEPROM 18 (as a tuning frequency area 64 described below), tuning-frequency data of the memory card 1 are written beforehand at the time of production.

The modulating circuit 19 modulates the data supplied from the communication control circuit 15 into a signal having a carrier frequency, and outputs it. An amplifying circuit 20 amplifies the modulated signal having the carrier frequency, supplied from the modulating circuit 19, to a level necessary for communication. The antenna 11 uses radio waves to transmit the carrier frequency signal amplified by the amplifying circuit 20.

Regarding the operation of the antenna 11, a process in which the antenna 11 receives radio waves transmitted from the reader-writer 2 and stores them in the EEPROM 18 is described below.

The radio waves received by the antenna 11 are converted into a corresponding electric signal, and the electric signal is supplied to the tuning circuit 12. The tuning circuit 12 extracts only a signal corresponding to the predetermined carrier frequency from the signal supplied from the antenna 11, and supplies it to the amplifying circuit 13. The amplifying circuit 13 amplifies the supplied signal to a predetermined signal level, and supplies it to the demodulating circuit 14.

The demodulating circuit 14 demodulates the signal supplied from the amplifying circuit 13, and supplies it to the communication control circuit 15. At this time, the mode of the communication control circuit 15 has been switched to the receiving mode. The communication control circuit 15 converts the signal supplied from the demodulating circuit 14 into digital data, and supplies them to the microcomputer 16. The microcomputer 16 determines whether the data supplied from the communication control circuit 15 should be stored. Based on determination, the supplied data are supplied and stored in the EEPROM 18 as required.

The electric signal from the antenna 11 is supplied to also the power supply circuit 21. The power supply circuit 21 extracts energy by using electromagnetic coupling with the carrier transmitted from the reader-writer 2, whereby necessary power is supplied to each block of the memory card 1. Power is supplied from the exterior to the memory card 1, as described above.

A process for the case where the data (from reader-writer 2) supplied from the communication control circuit 15 represent a request for transmitting the data stored in the EEPROM 18 is described below.

When the microcomputer 16 receives data (command) corresponding to the request for transmitting the data via the communication control circuit 15, it reads data from the EEPROM 18, and supplies the data to the communication control circuit 15. The communication control circuit 15 switches its mode to the transmission mode, and supplies the modulating circuit 19 with the data from the microcomputer 16.

The modulating circuit 19 modulates the signal supplied from the communication control circuit 15 into a signal having a carrier frequency, and supplies the modulated signal to the amplifying circuit 20. The amplifying circuit 20 amplifies the supplied signal to a level necessary for communication. The signal amplified by the amplifying circuit 20 is transmitted via the antenna 11.

Figure 2:
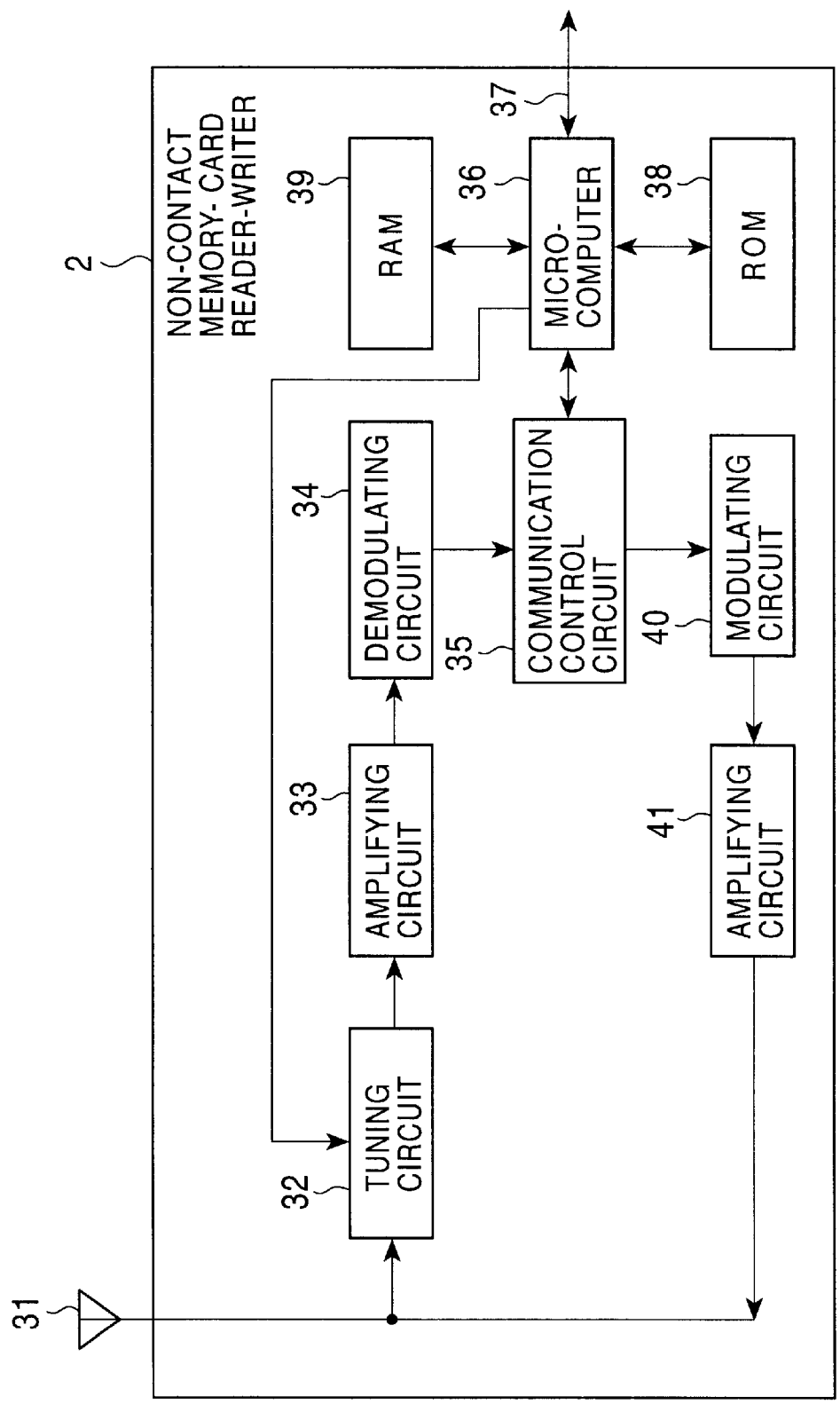
FIG. 2 is a block diagram showing a non-contact memory-card reader-writer 2 according to an embodiment of the present invention.

FIG. 2 shows the structure of a non-contact memory-card reader-writer 2 according to an embodiment of the present invention. An antenna 31 transmits a predetermined signal to the memory card 1, and performs transmission and reception of a predetermined carrier in order to establish communication with the memory card 1. The antenna 31 generates an electromagnetic field for supplying power to the memory card 1.

A tuning circuit 32 extracts, from the signal supplied from the antenna 31, a carrier frequency used for communication between the memory card 1 and the reader-writer 2. An amplifying circuit 33 amplifies an input signal to a predetermined level, and outputs it. A demodulating circuit 34 demodulates the modulated signal having the carrier frequency into predetermined data. A communication control circuit 35 performs switching between data transmission and reception, and controls communication.

A microcomputer 36 controls other blocks of the reader-writer 2 in accordance with a control program stored in the ROM 38. The microcomputer 36 also adjusts, based on tuning-frequency data supplied via the communication control circuit 35, the capacitance of a variable capacitor (not shown) in the tuning circuit 32. In other words, the microcomputer 36 adjusts a tuning frequency. The capacitance of the variable capacitor is adjusted by reading a capacitance corresponding to the tuning-frequency data stored in the ROM 38. Among the data supplied via the communication control circuit 35, data to be stored are supplied to a RAM 39 by the microcomputer 36, as required.

A RAM 39 stores the data supplied from the microcomputer 36. A modulating circuit 40 modulates the data supplied from the communication control circuit 35 into a signal having a carrier frequency, and outputs it. An amplifying circuit 41 amplifies the modulated signal supplied from the modulating circuit 40 to a level necessary for communication. The antenna 31 uses radio waves to transmit the amplified carrier-frequency signal.

Regarding the operation of the reader-writer 2, a process in which the reader-writer 2 receives data transmitted from the memory card 1 is described below. The carrier from the memory card 1, received by the antenna 31, is converted into a corresponding electric signal, and the electric signal is supplied to the tuning circuit 32. The tuning circuit 32 extracts, from the signal supplied from the antenna 31, a signal having the predetermined frequency, and supplies it to the amplifying circuit 33. The amplifying circuit 33 amplifies the signal supplied from the tuning circuit 32 to a predetermined signal level, and supplies it to the demodulating circuit 34.

The demodulating circuit 34 demodulates the modulated signal, and supplies it to the communication control circuit 35. The mode of the communication control circuit 35 is switched to the receiving mode. The communication control circuit 35 converts the signal supplied from the demodulating circuit 34 into digital data, and supplies them to the microcomputer 36. The microcomputer 36 temporarily stores, in the RAM 39, the data supplied from the communication control circuit 35. Subsequently, the microcomputer 36 transmits the stored data to an external circuit (not shown) via a communication line 37.

A process in which a data transmission request is generated and the predetermined data are transmitted from the reader-writer 2 to the memory card 1 is described below.

In such a case, data or the like to be stored in the memory card 1 are transmitted from the external circuit to the microcomputer 36 via the communication line 37, as required. The microcomputer 36 supplies the communication control circuit 35 with the data supplied via the communication line 37 or the data stored in the RAM 39.

The communication control circuit 35 converts the data supplied from the microcomputer 36 into an analog signal, and supplies it to the modulating circuit 40. The modulating circuit 40 modulates the signal supplied from the communication control circuit 35 into a signal having a predetermined carrier frequency, and supplies it to the amplifying circuit 41. The amplifying circuit 41 amplifies the signal supplied from the modulating circuit 40 to a level necessary for communication, and transmits the amplified signal via the antenna 31.

The transmitted signal via the antenna 31 is received by the antenna 11 in the memory card 1, and are written in the EEPROM 18, as described above.

Thereby, data can be transmitted and received between the memory card 1 and the reader-writer 2.

Figure 3:
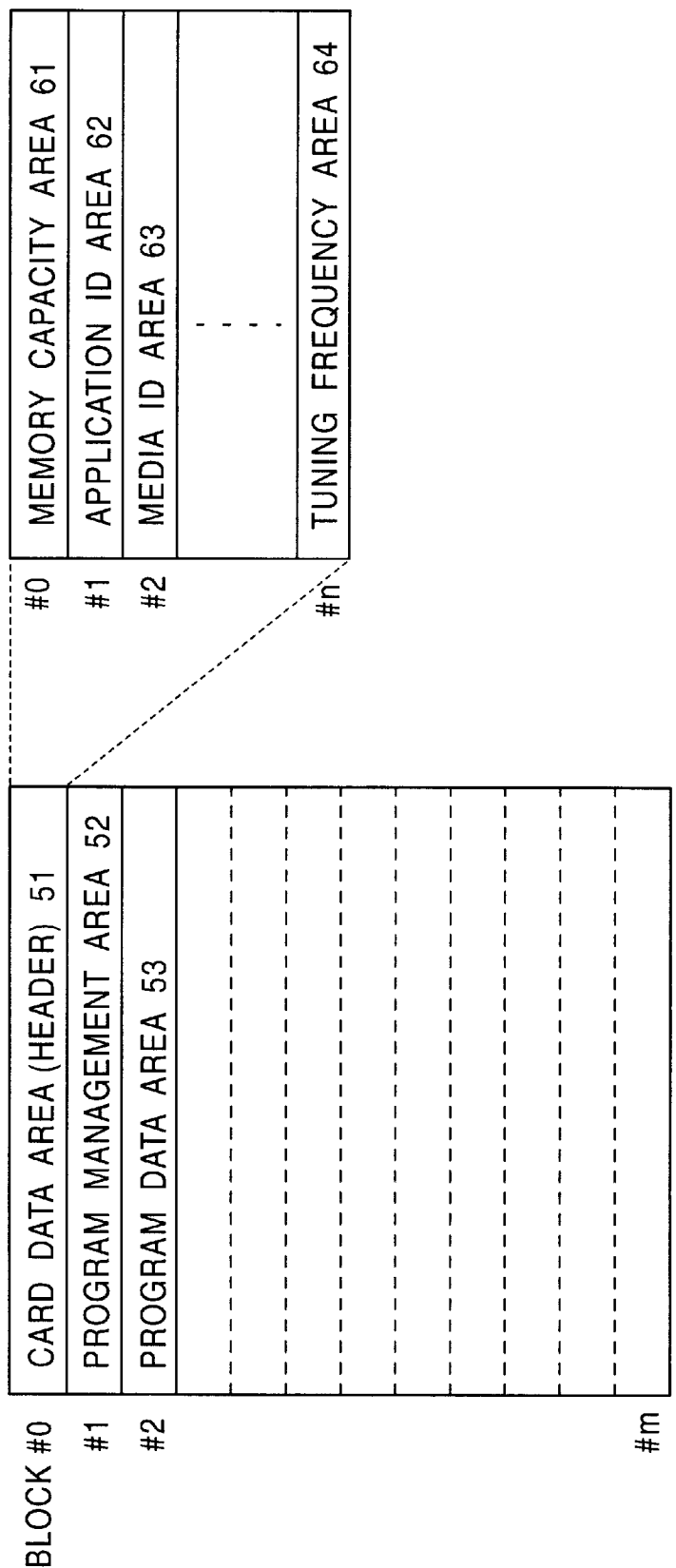
FIG. 3 is an illustration of a data structure in an EEPROM 18 in the memory card 1 shown in FIG. 1.

FIG. 3 shows an example of the structure of data stored in the EEPROM 18. As shown in FIG. 3, the EEPROM 18 includes a card data area 51, a program management area 52, and a program data area 53. The card data area 51 includes a memory capacity area 61, an application identification (ID) area 62, a medium ID area 63, and a tuning frequency area 64 in which the tuning frequency of the memory card 1 is stored.

Figure 4:
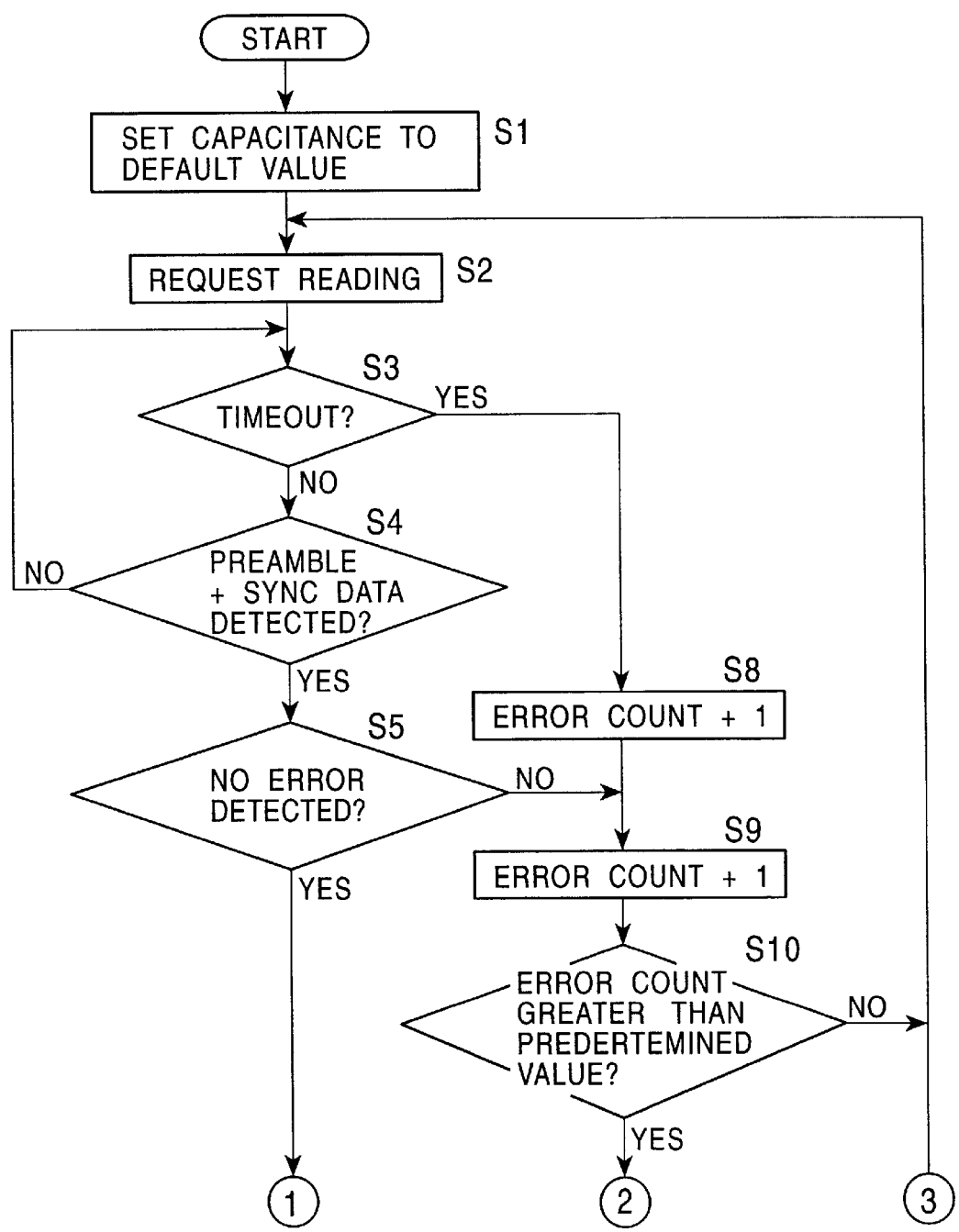
FIG. 4 is a flowchart illustrating a process in which a reader-writer 2 searches for an optimal tuning frequency.
Figure 5:
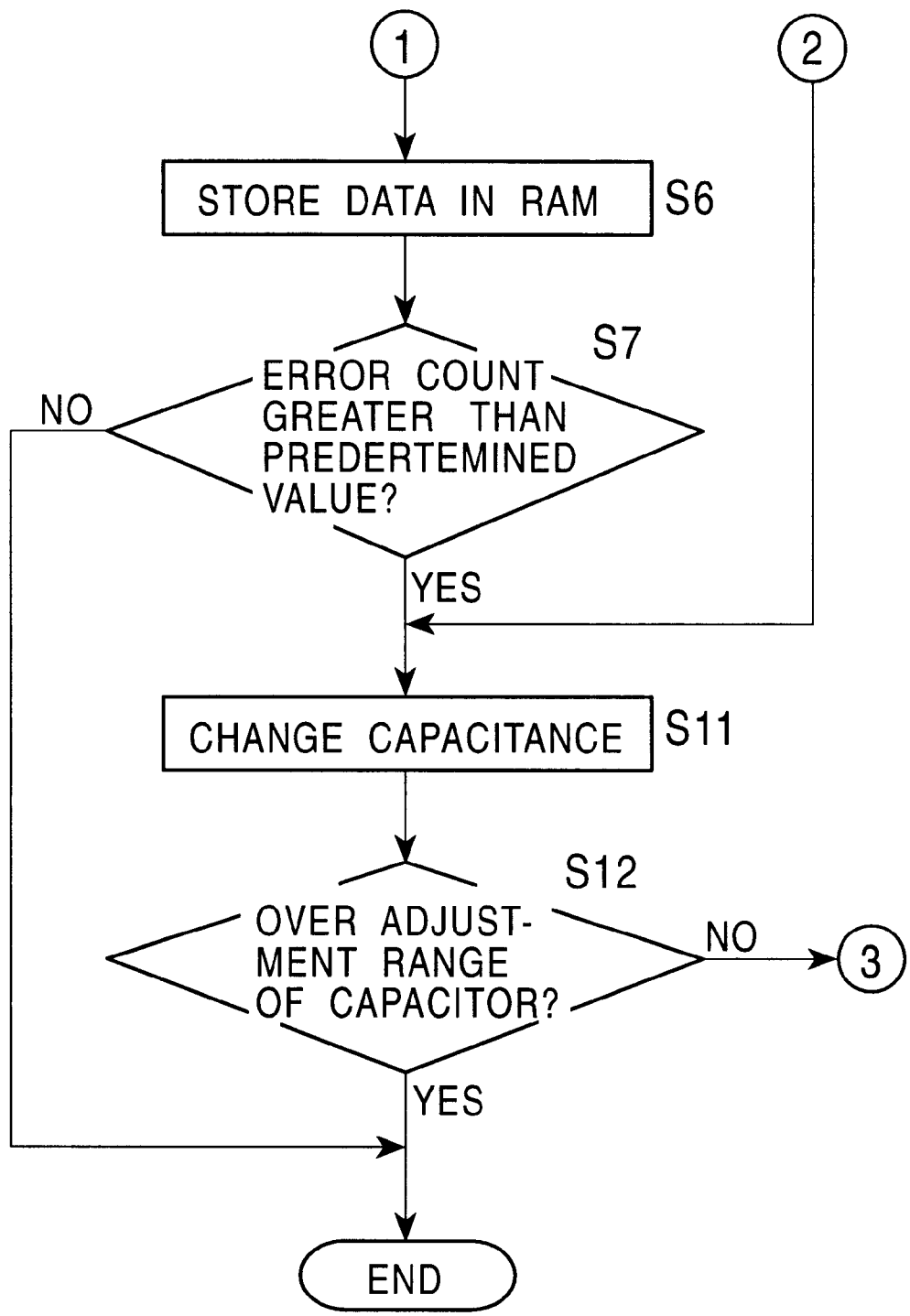
FIG. 5 is a flowchart following the flowchart shown in FIG. 4.

A process performed when the reader-writer 2 makes an automatic search for an optimal tuning frequency by using the microcomputer 36 to control the capacitance of the variable capacitor in the tuning circuit 32 is described below with reference to the flowcharts shown in FIGS. 4 and 5.

In step S1, the microcomputer 36 sets the capacitance of the tuning circuit 32 to a default value (corresponding to a predetermined tuning frequency), and proceeds to step S2. In step S2, the microcomputer 36 requests the memory card 1 to read the data stored in the EEPROM 18.

In step S3, the microcomputer 36 determines whether a response time of the memory card 1 is not greater than a predetermined time. If the response time is not greater than the predetermined time, the microcomputer 36 proceeds to step S4, and determines whether the response includes a preamble and synchronization data (hereinafter referred to as "sync data").

If the microcomputer 36 has determined in step S4 that the response includes a preamble and synchronization data, the microcomputer 36 proceeds to step S5. In step S5, the microcomputer 36 reads data, and determines whether an error-detecting code has an error. If the microcomputer 36 has determined in step S5 that the error detecting has no error, it proceeds to step S6, and stores the data in the RAM 39.

If the microcomputer 36 has determined in step S4 that the response includes no preamble and sync data, it returns to step S3, and the subsequent steps are performed again.

In step S7, the microcomputer 36 determines whether an error count is greater than a predetermined value. If the microcomputer 36 has determined in step S7 that the error count is not greater than the predetermined value, the process is terminated.

In step S3, the microcomputer 36 has determined that the response time of the memory card 1 is greater than the predetermined time, the microcomputer 36 proceeds to step S8, and increases the error count by one. In step S9, the microcomputer 36 further increases the error count by one, so that the error count is increased by a total of two. In order that optimal control may be realized by weighting error types and evaluating the frequency of errors, the error count is increased by two when the microcomputer 36 has determined that the response time of the memory card 1 is greater than the predetermined time.

In step S5, if the microcomputer 36 has determined that the error-detecting code has an error, it proceeds to step S9, and increases the error count by one before proceeding to step S10.

In step S10, the microcomputer 36 determines whether the error count is greater than a predetermined value. If the microcomputer 36 has determined that the error count is not greater than the predetermined value, the microcomputer 36 returns to step S2, and the subsequent steps are performed again.

In steps S7 and S10, if the microcomputer 36 has determined that the error count is greater than the predetermined value, the microcomputer 36 proceeds to step S11, and changes the capacitance of the variable capacitor in the tuning circuit 32.

In step S12, the microcomputer 36 determines whether the changed capacitance exceeds the adjustment range of the variable capacitor. If the microcomputer 36 has determined that the changed capacitance exceeds the adjustment range of the variable capacitor, the process is terminated. If the microcomputer 36 has determined that the changed capacitance does not exceed the adjustment range of the variable capacitor, the microcomputer 36 returns to step S2, and the subsequent steps are performed again.

The tuning frequency of the memory card 1 varies depending on humidity. Accordingly, material whose dielectric constant varies depending on humidity needs to be used as material for the variable capacitor in the tuning circuit 32. The microcomputer 36 detects a change in the dielectric constant, whereby optimal control is performed.

Figure 6:
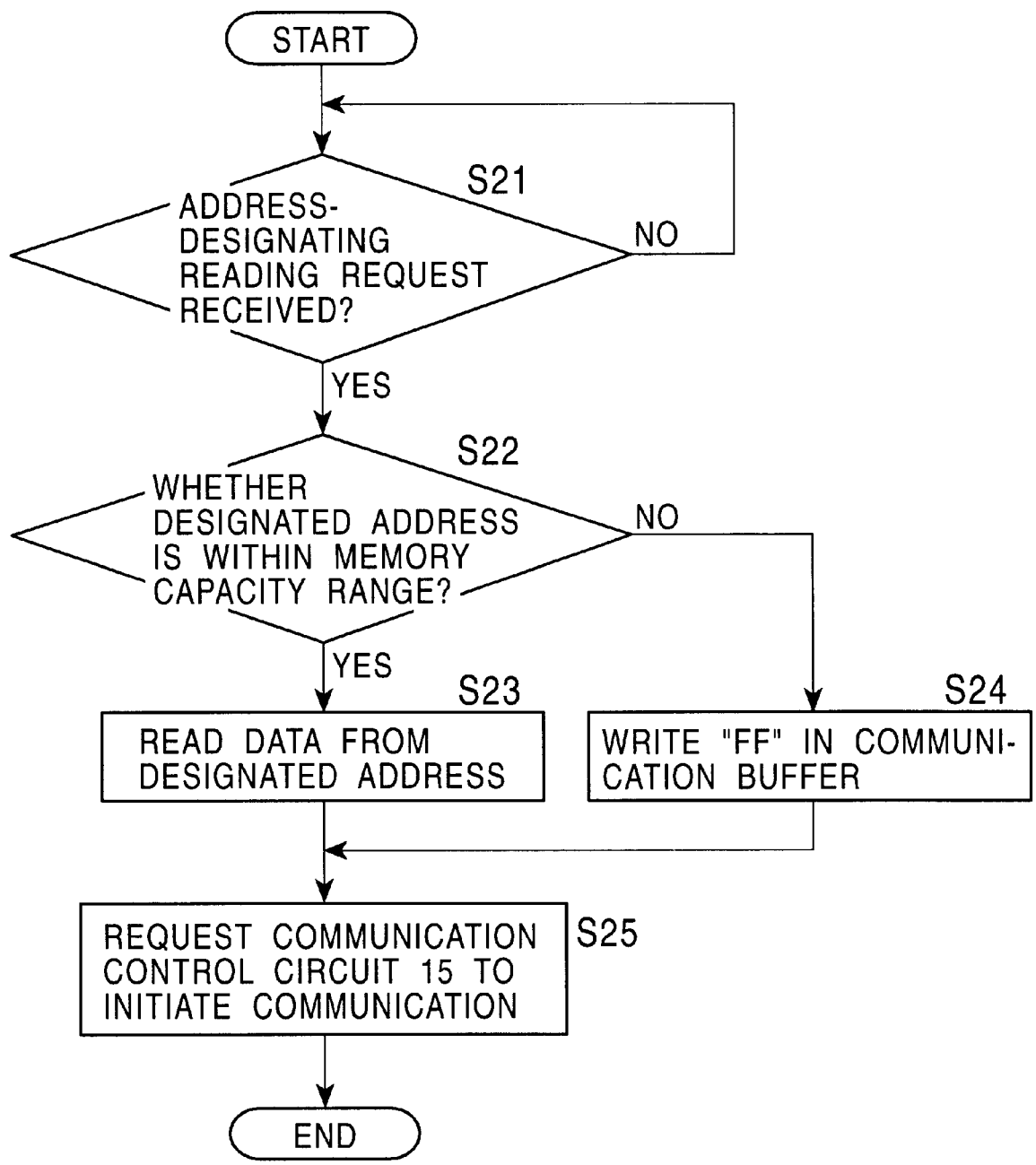
FIG. 6 is a flowchart illustrating a process performed when the memory card 1 has small storage capacity.

A process performed by the memory card 1 when the storage capacity of the memory card 1 is less than that of the reader-writer 2 is described below with reference to the flowchart shown in FIG. 6.

In step S21, the microcomputer 16 determines whether the memory card 1 has received an address-designating reading request from the reader-writer 2. If the microcomputer 16 has determined that the memory card 1 has received an address-designating reading request from the reader-writer 2, the microcomputer 16 proceeds to step S22. If the microcomputer 16 has determined that the memory card 1 has received no address-designating reading request from the reader-writer 2, the microcomputer 16 returns to step S21.

In step S22, the microcomputer 16 determines whether the address designated by the reader-writer 2 is within the capacity range of the EEPROM 18. If the microcomputer 16 has determined that the address designated by the reader-writer 2 is within the capacity range of the EEPROM 18, it proceeds to step S23, and reads data from the designated address.

In step S22, if the microcomputer 16 has determined that the address designated by the reader-writer 2 is not within the capacity range of the EEPROM 18, it proceeds to step S24, and writes dummy data (e.g., "FFh") in a built-in communication buffer (not shown).

In step S25, the microcomputer 16 outputs a communication start request to the communication control circuit 15, and the process is terminated.

Figure 7:
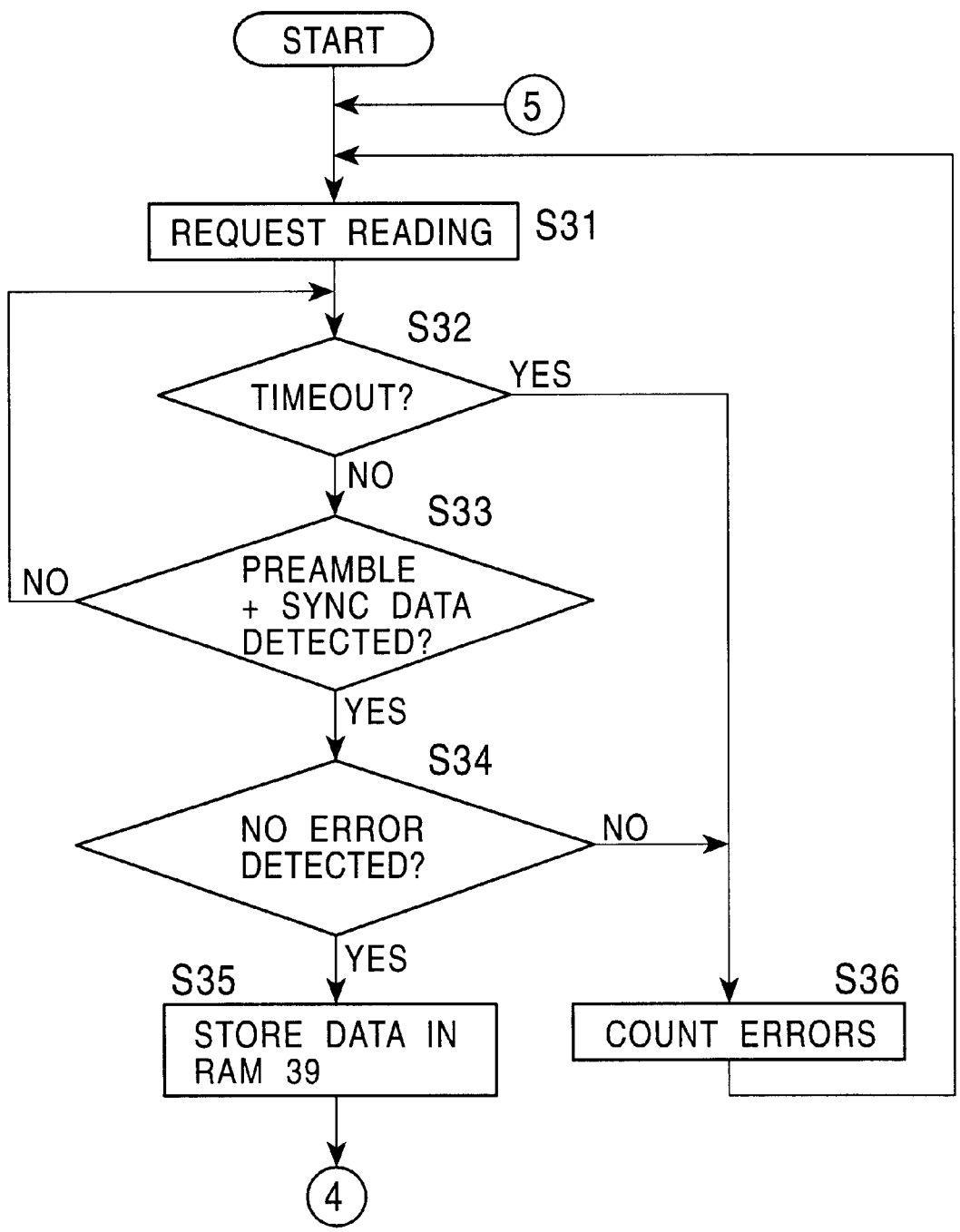
FIG. 7 is a flowchart illustrating a process in which the reader-writer 2 processes data by counting the number of errors in communication.
Figure 8:
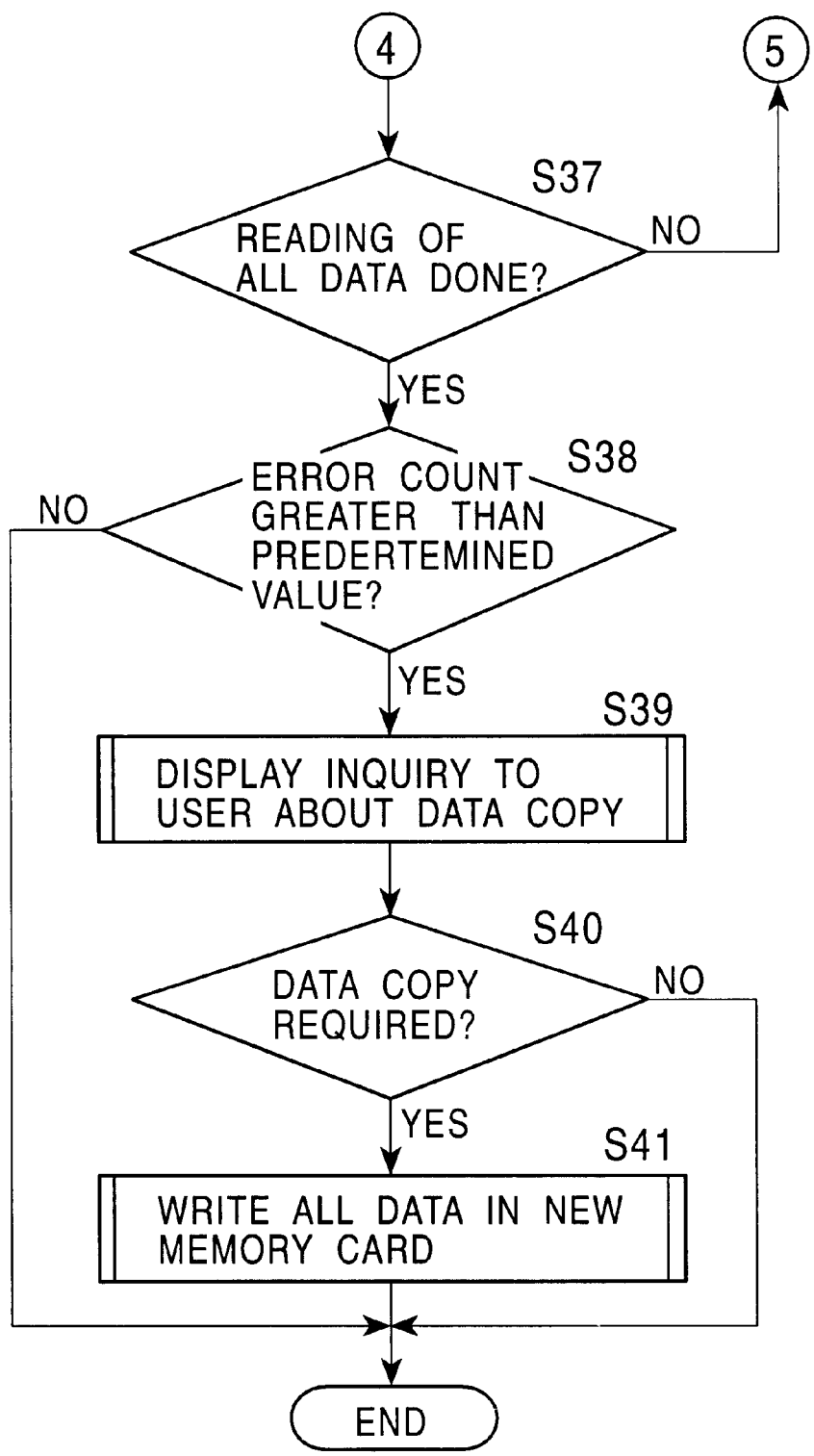
FIG. 8 is a flowchart following the flowchart shown in FIG. 7.

The reader-writer 2 counts the number of errors occurring in communication. If the number of errors is greater than a predetermined value, the reader-writer 2 stores the data stored in the EEPROM 18 in another memory card. This storage process is described below with reference to the flowcharts shown in FIGS. 7 and 8.

In step S31, the microcomputer 36 designates an address in the memory card 1, and requests the memory card 1 to read data stored in an EEPROM 18.

In step S32, the microcomputer 36 determines whether a response time of the memory card 1 is not greater than a predetermined time. If the response time is not greater than the predetermined time, the microcomputer 36 proceeds to step S33, and determines whether the response includes a preamble and sync data.

In step S33, if the microcomputer 36 has determined that the response includes a preamble and sync data, it proceeds to step S34. In step S34, the microcomputer 36 reads data, and determines whether an error-detecting code includes an error. If the microcomputer 36 has determined that the error-detecting code includes no error, it proceeds to step S35, and stores data in an RAM 39.

In step S33, if the microcomputer 36 has determined that the response includes no preamble and sync data, it returns to step S32, and the subsequent steps are performed again.

If the microcomputer 36 has determined in step S32 that the response time of the memory card 1 is greater than the predetermined time, or if the microcomputer 36 has determined in step S34 that the error-detecting code includes an error, it proceeds to step S36, and counts errors. The microcomputer 36 returns to step S31, and the subsequent steps are performed again.

In step S37, the microcomputer 36 determines whether all data have been read from the memory card 1. If the microcomputer 36 has determined that all data have not been read, it returns to step S31, and the subsequent steps are performed again.

In step S37, the microcomputer 36 has determined that all data have been read from the memory card 1, it proceeds to step S38, and determines whether the error count is not less than a predetermined value. If the microcomputer 36 has determined that the error count is less than the predetermined value, the process is terminated.

In step S38, the microcomputer 36 has determined that the error count is greater than a predetermined value, it proceeds to step S39, and causes a display apparatus 72 to display a dialog box for inquiring of the user whether the data stored in the RAM 39 should be stored in a new memory card different from the memory card 1.

In step S40, the user determines whether the data stored in the RAM 39 should be stored in the new memory card. If the user has determined that the data stored in the RAM 39 should not be stored in the new memory card, the process is terminated. If the user has determined that the data stored in the RAM 39 should be stored in the new memory card, the microcomputer 36 proceeds to step S41. In step S41, the microcomputer 36 reads and stores all the data stored in the RAM 39 in the new memory card, and the process is terminated.

Figure 9:
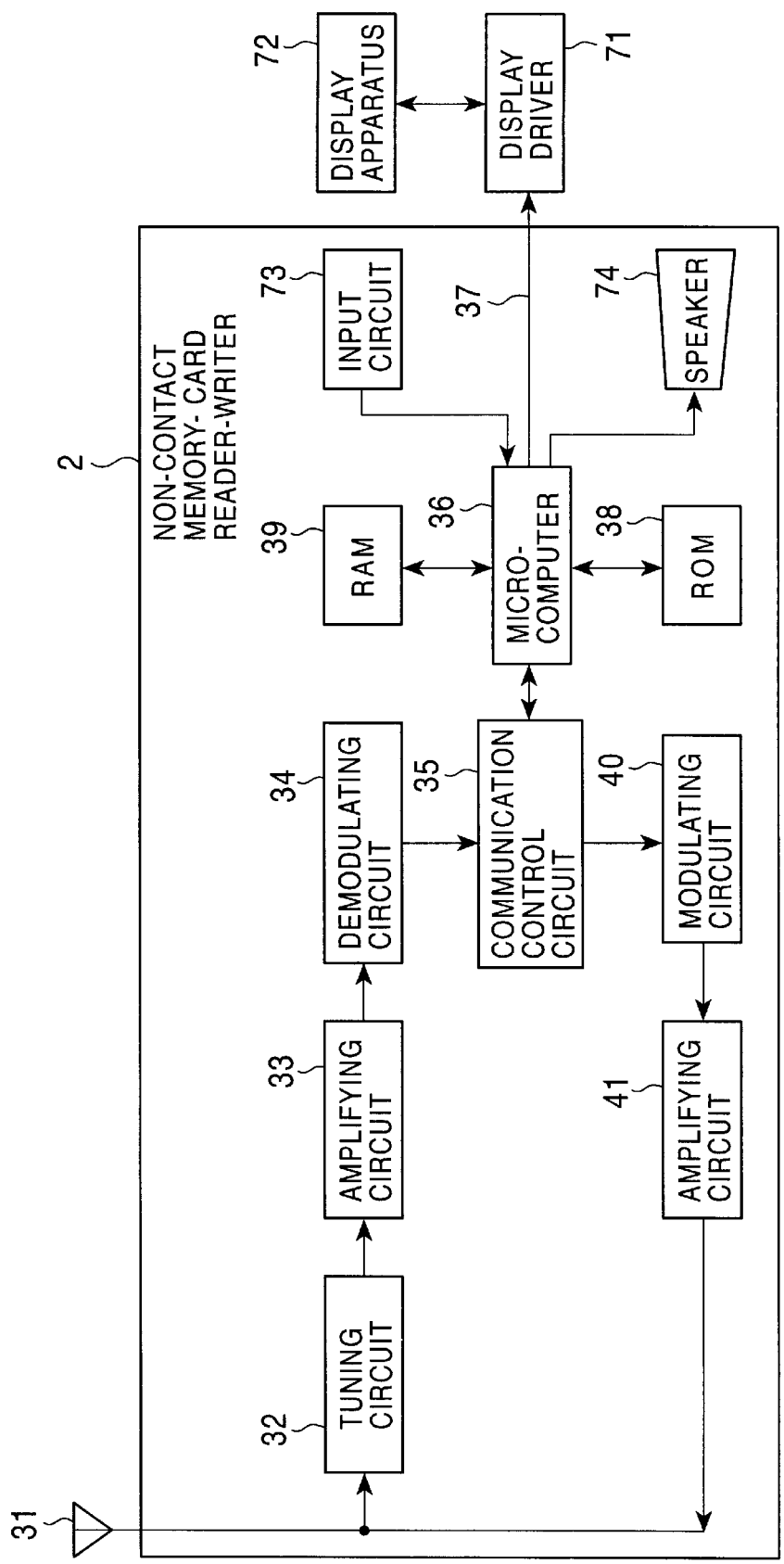
FIG. 9 is a block diagram showing a reader-writer 2 according to an embodiment of the present invention.

FIG. 9 shows the structure of a reader-writer 2 according to an embodiment of the present invention. This reader-writer 2 is basically identical to that shown in FIG. 2, but differs in that a display apparatus 72, an input circuit 73 for inputting information, and a speaker 74 for outputting sound are added.

Figure 10:
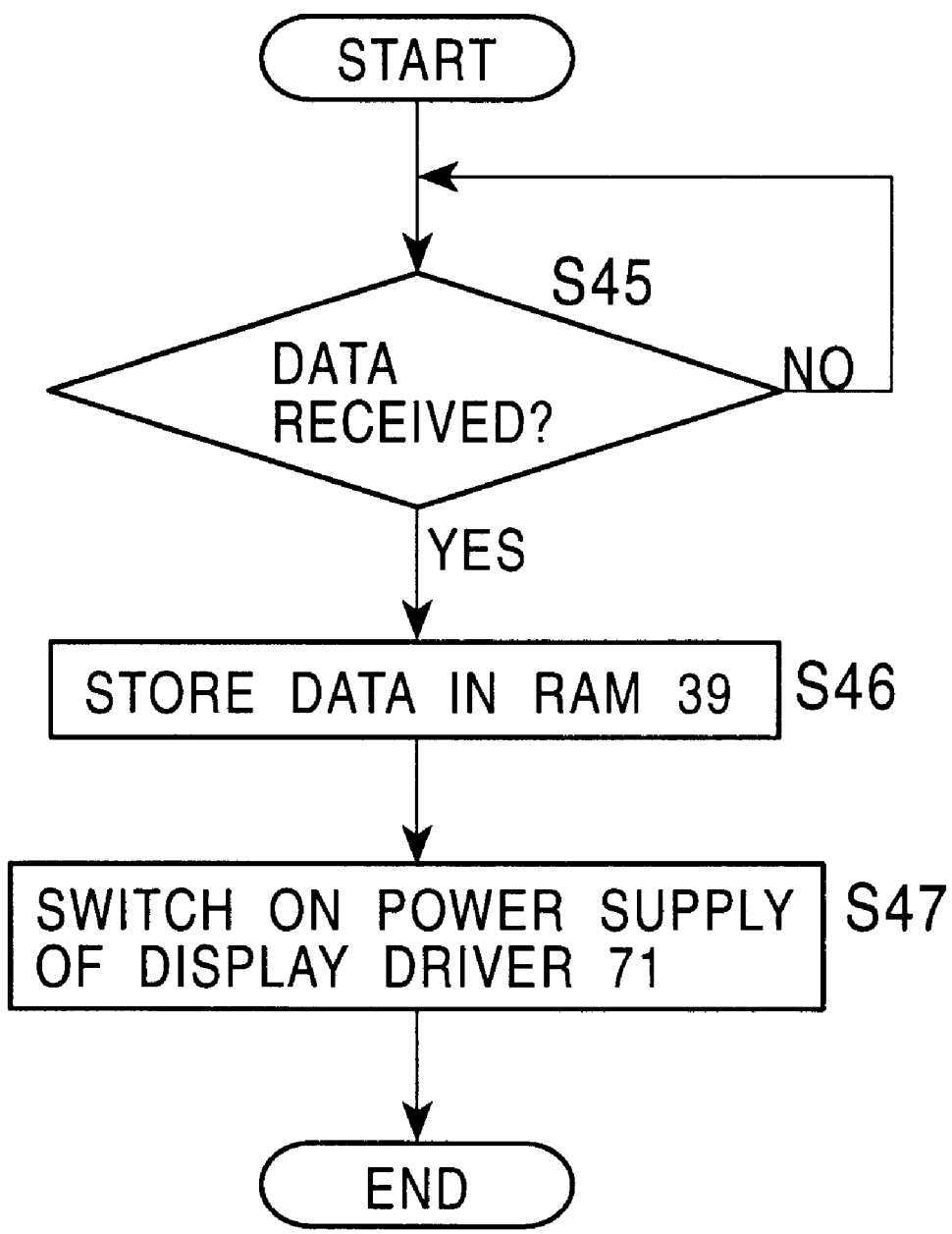

A process in which the reader-writer 2 (shown in FIG. 9) switches on the power supply of a display driver 71 in association with data reception is described below with reference to the flowchart shown in FIG. 10.

In step S45, microcomputer 36 determines whether data have been received from the memory card 1. If the microcomputer 36 has determined that data have not been received, it returns to step S45.

In step S45, if the microcomputer 36 has determined that data have been received, it proceeds to step S46, and stores the received data in a RAM 39.

In step S47, the microcomputer 36 sends a power-activating command to the display driver 71, whereby the power supply of the display driver 71 is switched on, and the process is terminated.

Figure 11:
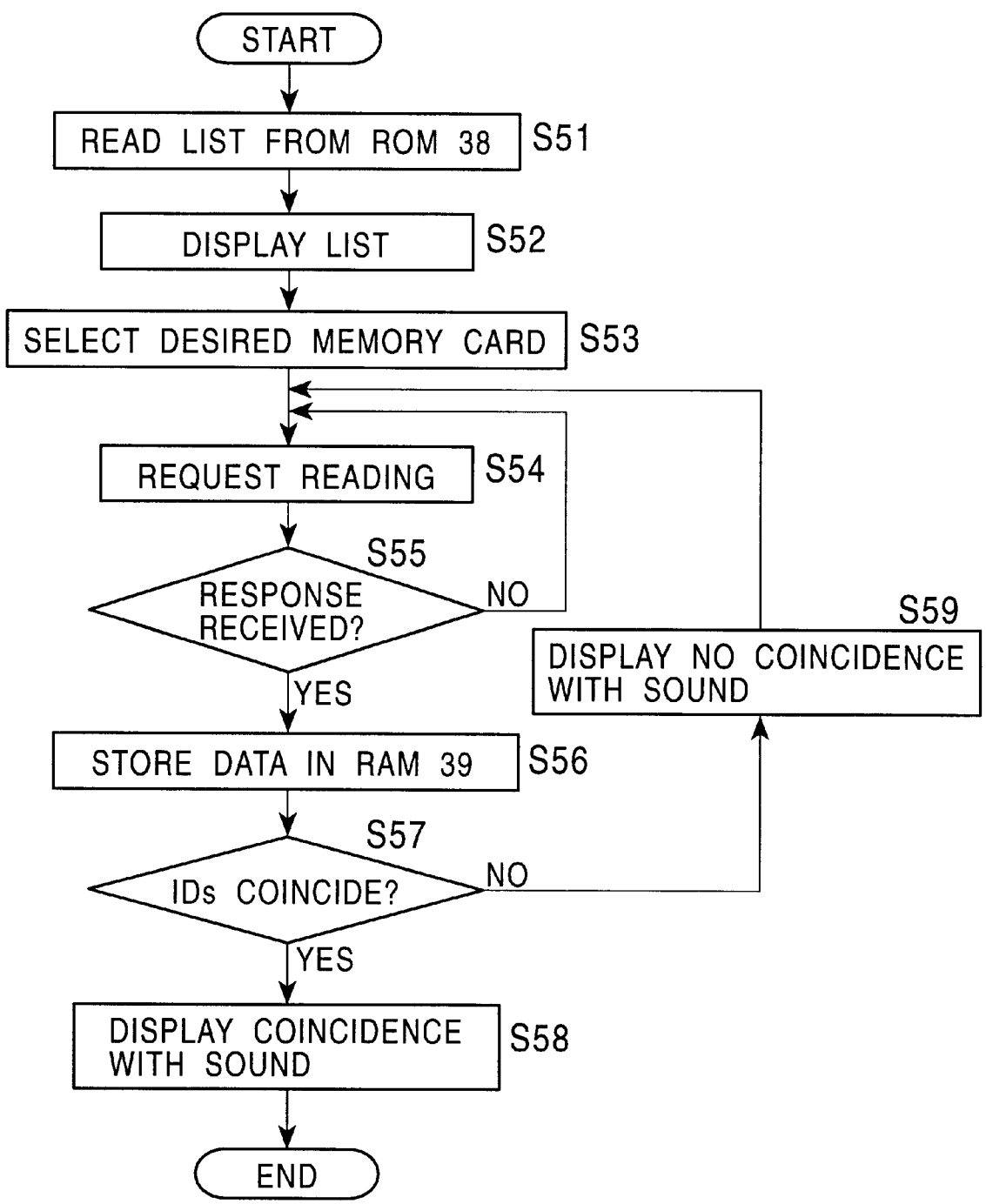
FIG. 11 is a flowchart illustrating a process in which the reader-writer 2 (shown in FIG. 9) identifies the desired memory card, based on identification data.

A process in which the reader-writer 2 (shown in FIG. 9) uses ID data to identify the memory card 1 is described below with the flowchart shown in FIG. 11. In this process, it is assumed that the information of the memory card 1 is stored in a ROM 38.

In step S51, the microcomputer 36 reads a memory card information list stored in the ROM 38, and proceeds to step S52. In step S52, the microcomputer 36 uses the display driver 71 to display the read list on the display apparatus 72.

In step S53, the user uses the input circuit 73 to select the desired memory card from the list displayed on the display apparatus 72.

In step S54, the user sequentially positions the reader-writer 2 to be close to each memory card. At this time, the microcomputer 36 requests the memory card to read stored data.

In step S55, the microcomputer 36 determines whether the memory card has sent a response to the request. If the microcomputer 36 has determined that no response has been received, it returns to step S54, and requests the memory card to read data again. If the microcomputer 36 has determined that a response has been received, it proceeds to step S56, and stores the read data in a RAM 39.

In step S57, the microcomputer 36 compares the ID data of the memory card selected by the user with the ID data of the memory card. In step S57, if the microcomputer 36 has determined that the ID data of both memory cards do not coincide, it proceeds to step S59. In step S59, the microcomputer 36 uses the display driver 71 to display no coincidence of the ID data on the display apparatus 72, and generates an alarm from a speaker 74. The microcomputer 36 returns to step S54, and requests another memory card to read stored data again.

In step S57, if the microcomputer 36 has determined that the ID data of both memory cards coincide, it proceeds to step S58. In step S58, the microcomputer 36 uses the display driver 71 to display a coincidence of the ID data on the display apparatus 72, and generates sound representing a coincidence from the speaker 74. After that, the process is terminated.

Figure 12:
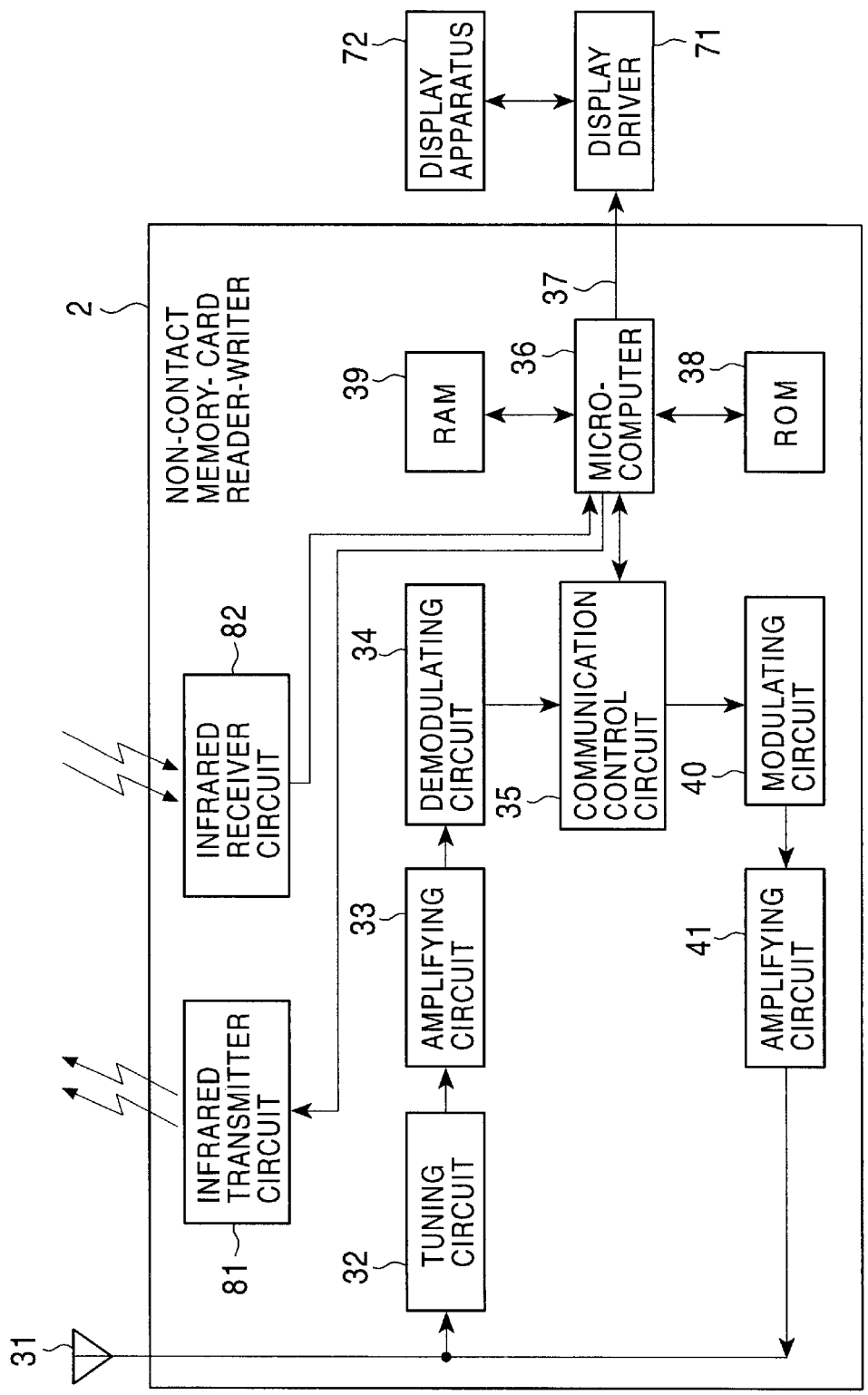
FIG. 12 is a block diagram showing a reader-writer 2 according to an embodiment of the present invention.

FIG. 12 shows the structure of a reader-writer 2 according to an embodiment of the present invention. This reader-writer 2 is basically identical to that shown in FIG. 2, but differs in that a display driver 71, a display apparatus 72, an infrared transmitter circuit 81, and an infrared receiver circuit 82 are added. A microcomputer 36 uses the infrared transmitter circuit 81 to transmit infrared radiation, and uses the infrared receiver circuit 82 to receive infrared radiation. An antenna 31 to an amplifying circuit 41, the display driver 71, and the display apparatus 72 are identical to those already described. Accordingly, descriptions thereof are omitted.

Figure 13:
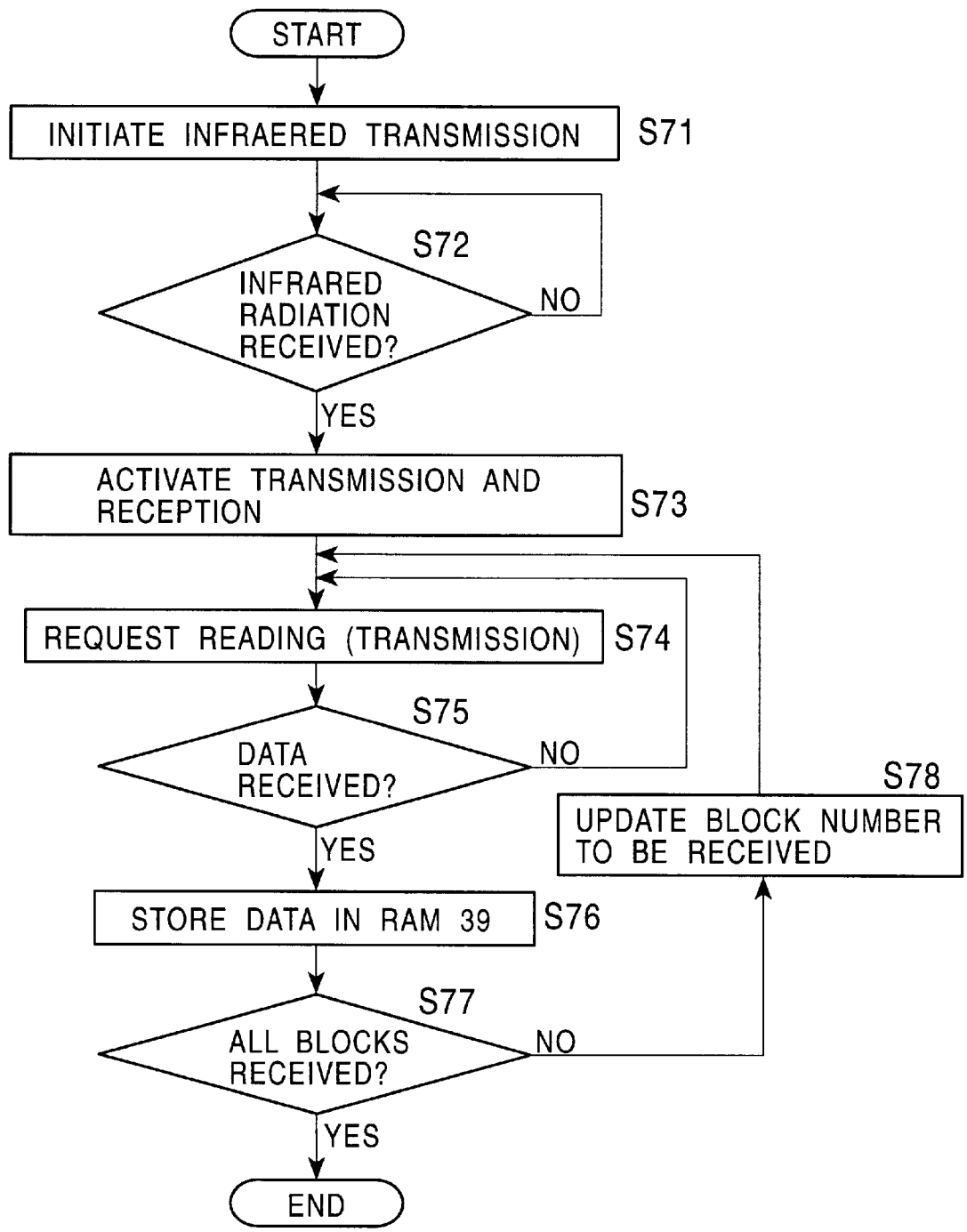
FIG. 13 is a flowchart illustrating a process in which the reader-writer 2 (shown in FIG. 12) determines a communicatable distance with the memory card 1.
Figure 14:
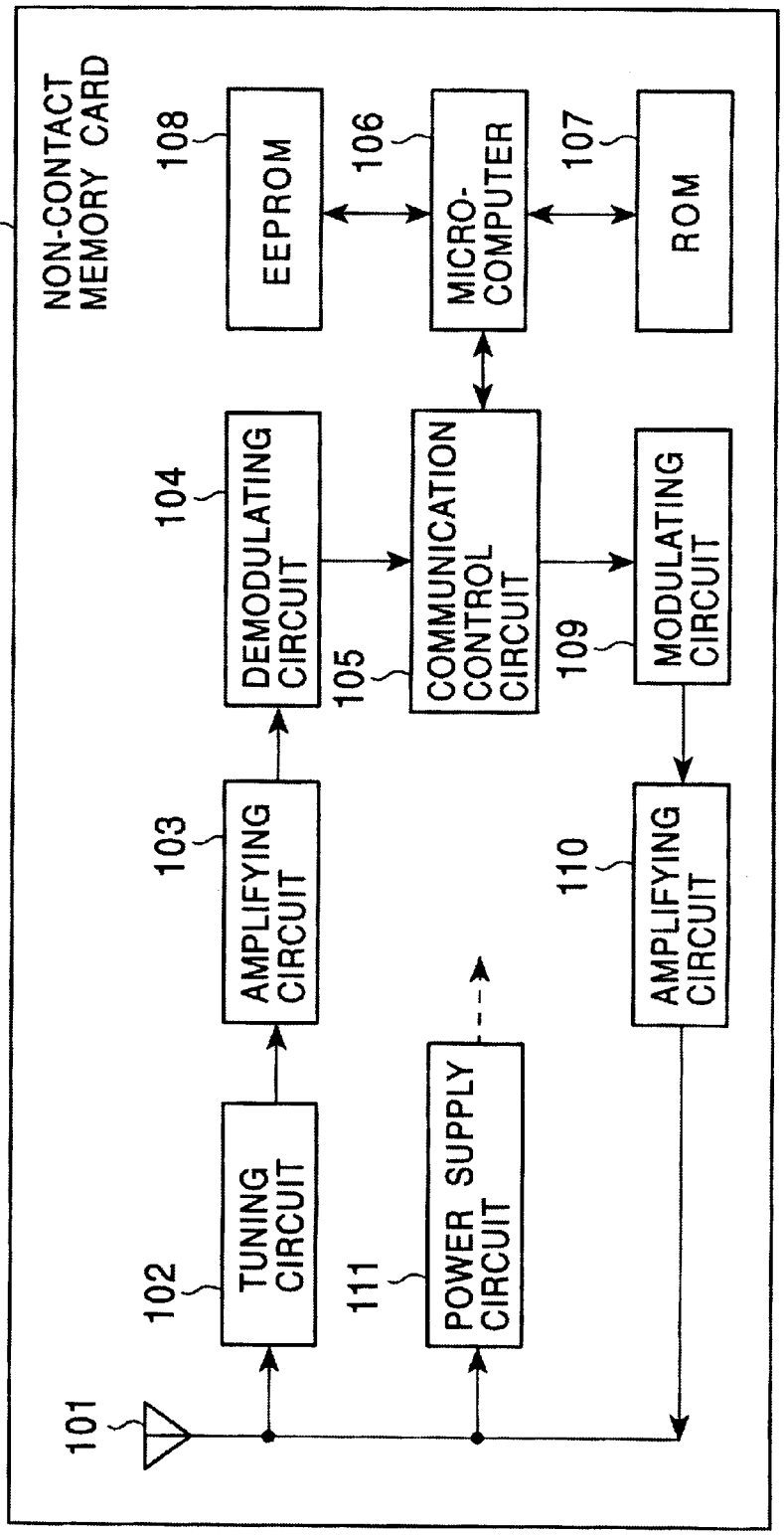
FIG. 14 is a block diagram showing a conventional memory card 91.
Figure 15:
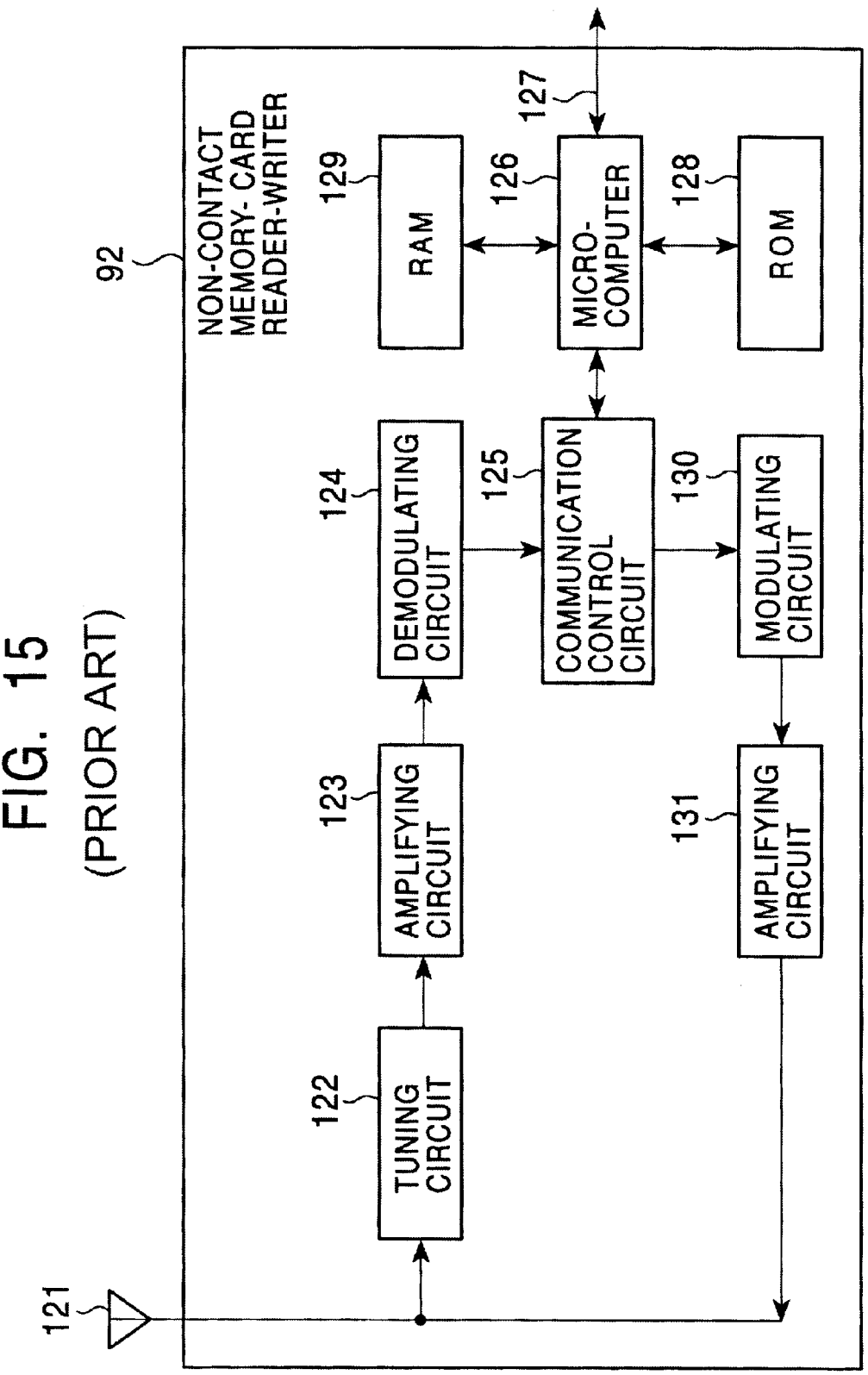
FIG. 15 is a block diagram showing a conventional memory card 92.

A process in which the reader-writer 2 (shown in FIG. 12) determines a communicable distance with the memory card 1 and initiates communication is described below with reference to the flowchart shown in FIG. 13.

In step S71, the microcomputer 36 uses the infrared transmitter circuit 81 to transmit infrared radiation to the memory card 1 In step S72, the microcomputer 36 determines whether the infrared-receiver circuit 82 has received infrared radiation. The infrared receiver circuit 82 is set so as to receive the infrared radiation when the distance between the reader-writer 2 and the memory card 1 is a predetermined value.

In step S72, if the microcomputer 36 has determined that the infrared receiver circuit 82 has not received infrared radiation (communication is impossible), it returns to step S72. If the microcomputer 36 has determined that the infrared receiver circuit 82 has received infrared radiation (communication is possible), it proceeds to step S73, and enables data transmission and reception.

In step S74, the microcomputer 36 initializes a block number for reception, and requests the memory card 1 to read stored data.

In step S75, the microcomputer 36 determines whether data have been received. If the microcomputer 36 has determined that no data have been received, it returns to step S74, and requests the memory card 1 to read stored data again.

In step S75, if the microcomputer 36 has determined that data have been received, it proceeds to step S76, and stores the data in a RAM 39.

In step S77, the microcomputer 36 determines whether all blocks of data have been received. If the microcomputer 36 has determined that all blocks have not been received, it proceeds to step S78. In step S78, the microcomputer 36 updates a block number to be received, and returns to step S74.

In step S77, if the microcomputer 36 has determined that all blocks have been received, the process is terminated.

In the present invention, the types of provision medium for providing a computer program that executes the above-described processes include not only information recording media such as magnetic disks and CD-ROMs but also network transmission media such as the Internet and digital satellite links.

What is claimed is:

1. A storage device for storing and processing information and for performing information transmission and reception with an external unit, said storage device comprising:
   storage means for storing tuning-frequency data;
   extracting means for extracting a tuning frequency from a received signal; and
   adjusting means for adjusting, based on the tuning-frequency data stored in said storage means, the tuning frequency extracted by said extracting means.

2. A storage device according to claim 1, further comprising adding means for adding dummy data when an address designated by said external unit is not stored in said storage means.

3. A storage method for storing and processing information and for performing information transmission and reception with an external unit, said storage method comprising the steps of:

storing tuning-frequency data;

extracting a tuning frequency from a received signal; and adjusting, based on the tuning-frequency data stored in the storing step, the tuning frequency extracted in the extracting step.

4. A provision medium for providing a program to a storage device for storing and processing information and for performing information transmission and reception with an external unit, said program causing said storage device to execute a process including the steps of:

storing tuning-frequency data;

extracting a tuning frequency from a received signal; and adjusting, based on the tuning-frequency data stored in the storing step, the tuning frequency extracted in the extracting step.

5. An information processing apparatus for accessing a non-contact storage device, comprising:

communication control means for controlling transmission and reception of signals, and generating tuning frequency data;

extracting means for extracting a tuning frequency from a received signal;

adjusting means for adjusting the tuning frequency extracted by said extracting means, based on said tuning frequency data supplied from said communication control means; and storage means for storing data read from said non-contact storage device.

6. An information processing apparatus for accessing a non-contact storage device, comprising:

extracting means for extracting a tuning frequency from a received signal;

adjusting means for adjusting the tuning frequency extracted by said extracting means;

storage means for storing data read from said non-contact storage device; and display control means for displaying the data.

7. An information processing apparatus according to claim 6, further comprising:

reception-determination means for determining whether the data read from said non-contact storage device have been received; and power-supply activating means for switching on, based on determination of said reception-determination means, the power supply of said display control means.

8. An information processing apparatus according to claim 6, further comprising:

communication-distance determination means for determining a distance over which said information processing apparatus can communicate with said non-contact storage device; and power-supply activating means for switching on, based on determination of said communication-distance determination means, the power supply of said display control means.

9. An information processing apparatus for accessing a non-contact storage device, comprising:

extracting means for extracting a tuning frequency from a received signal;

adjusting means for adjusting the tuning frequency extracted by said extracting means;

storage means for storing data read from said non-contact storage device; and error-determination means for counting the number of errors occurring in communication with said non-contact storage device and determining whether the number of errors is greater than a predetermined value.

10. An information processing apparatus according to claim 9, further comprising writing means for writing, in a storage device, the data stored in said storage means when said error-determination means has determined that the number of errors is greater than the predetermined value.

11. An information processing apparatus for accessing a non-contact storage device, comprising:

extracting means for extracting a tuning frequency from a received signal;

adjusting means for adjusting the tuning frequency extracted by said extracting means;

storage means for storing data read from said non-contact storage device;

second storage means for storing data of a plurality of storage devices beforehand; and comparing means for comparing the data stored in said second storage means and data on said non-contact storage device.

12. An information processing apparatus for accessing a non-contact storage device, comprising:

extracting means for extracting a tuning frequency from a received signal;

adjusting means for adjusting the tuning frequency extracted by said extracting means; and storage means for storing data read from said non-contact storage device, wherein said adjusting means adjusts the tuning frequency by changing the capacitance of a capacitor.

13. An information processing apparatus for accessing a non-contact storage device, comprising:

extracting means for extracting a tuning frequency from a received signal;

adjusting means for adjusting the tuning frequency extracted by said extracting means; and storage means for storing data read from said non-contact storage device;

wherein said adjusting means adjusts the tuning frequency by detecting the dielectric constant of a capacitor which varies depending on humidity.

14. An information processing method for accessing a non-contact storage device, comprising the steps of:

generating tuning frequency data;

controlling transmission and reception of signals;

extracting a tuning frequency from a received signal;

adjusting the tuning frequency extracted in the extracting step, based on said tuning frequency data; and storing data read from said non-contact storage device.

15. A provision medium for providing a program to an information processing apparatus for accessing a non-contact storage device, said program causing said information processing apparatus to execute a process including the steps of:

generating tuning frequency data;

controlling transmission and reception of signals;

extracting a tuning frequency from a received signal;

adjusting the tuning frequency extracted in the extracting step, based on said tuning frequency data; and storing data read from said non-contact storage device.

* * * * *